US011646586B2

United States Patent
Gagne et al.

(10) Patent No.: US 11,646,586 B2
(45) Date of Patent: May 9, 2023

(54) HYBRID POWER BACKUP STORAGE SYSTEM

(71) Applicant: 2449049 Ontario Inc., Mississauga (CA)

(72) Inventors: Marc James Gagne, Mississauga (CA); Andrew Clark Baird Aubert, Waterdown (CA)

(73) Assignee: 2449049 Ontario Inc., Mississauga (CA)

( * ) Notice: Subject to any disclaimer, the term of this patent is extended or adjusted under 35 U.S.C. 154(b) by 410 days.

(21) Appl. No.: 16/658,696

(22) Filed: Oct. 21, 2019

(65) Prior Publication Data

US 2020/0127464 A1 Apr. 23, 2020

Related U.S. Application Data

(60) Provisional application No. 62/749,252, filed on Oct. 23, 2018.

(51) Int. Cl.
*H02J 7/00* (2006.01)

(52) U.S. Cl.
CPC ............ *H02J 7/00036* (2020.01); *H02J 7/00* (2013.01); *H02J 7/0068* (2013.01); *H02J 7/007194* (2020.01); *H02J 2310/40* (2020.01)

(58) Field of Classification Search
CPC ........ H02J 7/0003; H02J 7/007; H02J 7/0052; H02J 7/0068; H02J 7/345
USPC ................................ 320/115, 124, 127, 135
See application file for complete search history.

(56) References Cited

U.S. PATENT DOCUMENTS

| 9,678,547 | B1* | 6/2017 | Mirov | G06F 1/3206 |
| 2006/0078773 | A1 | 4/2006 | Speranza et al. | |
| 2006/0249957 | A1* | 11/2006 | Ito | F03D 7/026 |
| | | | | 290/44 |
| 2007/0115006 | A1* | 5/2007 | Anude | G01R 31/016 |
| | | | | 324/678 |
| 2008/0021602 | A1 | 1/2008 | Kingham et al. | |
| 2008/0028247 | A1 | 1/2008 | Muraoka | |
| 2009/0031072 | A1 | 1/2009 | Sartore | |
| 2010/0013324 | A1* | 1/2010 | Yamashita | H01M 10/44 |
| | | | | 307/125 |
| 2012/0105008 | A1* | 5/2012 | Lipcsei | H02J 7/00718 |
| | | | | 320/134 |

(Continued)

FOREIGN PATENT DOCUMENTS

| CN | 101795009 A | * 8/2010 |
| CN | 108556654 A | * 9/2018 |

(Continued)

OTHER PUBLICATIONS

Lahyani et al., "Battery/Supercapacitors Combination in Uninterruptible Power Supply (UPS)", IEEE Transactions on Power Electronics, vol. 28, No. 4, pp. 1509-1522 (2013).

(Continued)

*Primary Examiner* — Zixuan Zhou
(74) *Attorney, Agent, or Firm* — Joseph F. Murphy; Potomac Law Group, PLLC (57) ABSTRACT

A hybrid power backup system having at least one battery for powering at least one external load; at least one capacitor for powering a controller configured to control power provided from the battery to the at least one external load and to control discharge/charge cycles of the battery.

19 Claims, 4 Drawing Sheets

(56) References Cited

U.S. PATENT DOCUMENTS

| | | | |
|---|---|---|---|
| 2012/0158245 A1* | 6/2012 | Yoshizawa | H02M 3/1582 |
| | | | 701/36 |
| 2015/0333513 A1* | 11/2015 | Yamada | B60L 15/007 |
| | | | 307/46 |
| 2015/0333554 A1* | 11/2015 | Cohen | H02J 9/062 |
| | | | 324/426 |
| 2016/0071552 A1 | 3/2016 | Ohwada et al. | |
| 2016/0204654 A1 | 7/2016 | Mondal et al. | |
| 2016/0339787 A1* | 11/2016 | Jang | B60L 53/00 |
| 2016/0369855 A1* | 12/2016 | Essenmacher | F16D 41/14 |
| 2017/0201120 A1* | 7/2017 | Lisini | H02J 7/0068 |
| 2017/0214070 A1* | 7/2017 | Wang | G01R 19/0092 |
| 2018/0115178 A1* | 4/2018 | Moon | H02J 7/00306 |

FOREIGN PATENT DOCUMENTS

| | | | |
|---|---|---|---|
| WO | 2005063520 A1 | 7/2005 | |
| WO | WO-2016093979 A1 * | 6/2016 | H01M 2/1055 |

OTHER PUBLICATIONS

Lin et al., "Research on the Capacity of Hybrid Energy Storage System and its Control Method in Rail Transit Traction Grid", Proceedings of ICSGCE 2015/IWCSG 2015, Offenburg, Germany, pp. 197-200 (2015).

Lindsay et al., "How supercapacitors can help fleets implement no-idling", https://www.fleetpoint.org/expertblog/how-supercapacitors-can-help-fleets-implement-no-idling, May 6, 2015.

Pottharst et al., "Design and Implementation of a Hybrid Energy Supply System for Railway Vehicles", Applied Power Electronics Conference and Exposition, Mar. 6-10, 2005, pp. 1-7.

Thounthong et al., "Analysis of Supercapacitor as Second Source Based on Fuel Cell Power Generation", IEEE Transactions on Energy Conversion, vol. 24, No. 1, pp. 247-255 (2009).

International Search Report for PCT/CA2019/051487, dated Jan. 13, 2020.

Supplementary European Search Report issued in European Patent Application No. 19875499.6 dated Jul. 26, 2022.

Coates, Eric, https://learnabout-electronics.org/PSU/psu12.php, dated Dec. 29, 2020; accessed Jun. 13, 2022.

\* cited by examiner

HYBRID POWER BACKUP STORAGE SYSTEM

CROSS-REFERENCE TO RELATED APPLICATIONS

This utility application claims the benefit under 35 U.S.C. § 119(e) of Provisional Application Ser. No. 62/749,252 filed on Oct. 23, 2018, entitled HYBRID POWER BACKUP STORAGE SYSTEM. The entire disclosure of the provisional application is incorporated by reference herein.

FIELD OF THE DISCLOSURE

This disclosure relates to a hybrid power back-up storage system to extend the life of a battery used in transit emergency power back-up systems.

BACKGROUND

In the rail industry, it is very common to cut off power to a train car for extended periods of time. For example the train car may be in an out of service state overnight, on weekends, while undergoing repair, etc. Another common occurrence is when a train car experiences an emergency and main power, for example otherwise available from the locomotive or from the shore (power grid), is cut off to the train car. In such out of service states or emergency situations, referred to herein as off-line events, a power backup system is employed.

Conventional power backup systems engage and deplete their backup power storage resources (such as a battery) over the course of such an extended off-line event. Rechargeable battery operational life is typically assessed and rated in terms of a number of full charge/discharge cycles of the rechargeable battery. A typical rechargeable battery can tolerate 1000 full charge/discharge cycles. When a rechargeable battery is employed in such a conventional power back system, each battery depletion event counts as a full battery discharge cycle.

In some prior art power backup systems, a controller is employed to control various loads external to the power backup system to limit power drain from the battery; that is the battery provides power to both the controller and to the loads external to the power backup system.

In a subset of such prior art power backup systems, a capacitor is used with the battery such that both the battery and capacitor power the controller and any external loads to the system.

These prior art power backup systems do not reduce the number of charge/discharge cycles of the rechargeable battery.

SUMMARY

There is needed a hybrid battery/capacitor power backup system wherein the capacitor powers the controller and the battery powers at least one external load.

There is also a need for a method of control in a hybrid battery/capacitor power backup system, which reduces the number of full charge/discharge cycles incurred by a rechargeable battery used in the power backup system thereby increasing the operational life of the battery in terms of full charge/discharge cycles.

According to one aspect, there is provided a hybrid power backup system, in one alternative, comprising: at least one battery for use in powering at least one external load; and a controller in communication with said at least one battery, said controller being configured to control power provided by said at least one battery to said at least one external load and for controlling discharge cycles of said battery; and at least one capacitor for use in powering said controller.

According to another aspect, there is provided a hybrid power back-up system for use when a train car is in an idle state or in a state in which mains power ceases to be available to the train car, said hybrid power back-up system comprising: at least one battery for use in powering at least one external load of said train car when in said state; a controller in communication with said at least one battery, said controller being configured to control power provided said at least one battery to said at least one external load and for controlling discharge cycles of said battery; and at least one capacitor, preferably a supercapacitor, for use in powering said controller. During idle states, the controller of the hybrid power backup system is exclusively powered by said at least one capacitor. According to one alternative, said at least one capacitor powering the controller is preferably a supercapacitor.

According to one alternative, said controller limits each discharge cycle via a timer, preferably in the range of from about 90 to about 105 minutes from initial discharge cycle start of a power loss event, and disconnects the at least one battery from said at least one external load.

According to one alternative, said battery has a power rating of 36V, 10 Ah.

According to yet another alternative, said capacitor has a capacity rating of 2.7V, 1200 F.

According to yet another alternative, there is provided a method of reducing the frequency of charge/discharge cycles of a rechargeable battery in a power backup system of a train car, said power back-up system comprising: i) at least one battery for use in powering at least one external load; ii) at least one capacitor; and iii) a controller powered by said at least one capacitor and in communication with said at least one battery; said method comprising: powering said controller with said capacitor; said controller obtaining one of a signal and a command to begin monitoring a power discharge level in said at least one battery; and said controller disconnecting said at least one battery from said at least one external load when a battery power discharge level reaches a discharge threshold, wherein power drain from said at least one battery is limited such that full discharge thereof is prevented.

According to yet another alternative there is provided the use of the power back-up system as described herein for limiting discharge/charge cycles of a battery and thereby extending the overall life of said battery.

According to one alternative, there is provided a hybrid power backup system comprising: at least one battery for use in powering at least one external load; a controller in communication with said at least one battery, said controller being configured to control power provided by said at least one battery to said at least one external load and for controlling discharge cycles of said battery; and at least one capacitor for use in powering said controller.

In one alternative the controller is configured to limit battery discharge by disconnecting said at least one external load from said at least one battery preventing full cycle discharge.

According to yet another alternative the controller is configured to limit each discharge of the at least one battery via a timer.

According to yet another alternative said timer is set in a range from about 90 to about 105 minutes from initial discharge start of a power loss event.

According to yet another alternative the hybrid power backup system further comprises an input signal line providing an indication of power loss to the controller.

In one alternative said battery has a power rating of 36V, 10 Ah.

In one alternative said at least one capacitor is a supercapacitor.

In one alternative said capacitor has a capacity rating of 2.7V, 1200 F.

In one alternative, each external load comprises at least one load from: a lighting system, a communication system, an Ethernet switch, a radio transceiver, a radio receiver, a radio transmitter and an amplifier.

According to yet another alternative, there is provided a hybrid power backup system for use when a train car is in an idle state or in a state in which mains power is ceases to be available to the train car, said hybrid power back-up system comprising: at least one battery for use in powering at least one external load of said train car when in said state; a controller in communication with said at least one battery, said controller being configured to control power provided said at least one battery to said at least one external load and for controlling discharge cycles of said battery; and at least one capacitor, preferably a supercapacitor, for use in powering said controller.

In one alternative the controller is configured to limit battery discharge by disconnecting said at least one external load from said at least one battery preventing full cycle discharge.

In yet another alternative said controller is configured to limit each discharge of the at least one battery via a timer.

In yet another alternative said timer is set in a range from about 90 to about 105 minutes from initial discharge start of a power loss event.

In yet another alternative, the hybrid power backup system further comprises an input signal line providing an indication of power loss to the controller.

According to yet another alternative there is provided a method of reducing frequency of full discharge cycles of a rechargeable battery in a power backup system of a train car with the system described herein, said method comprising: powering said controller with said capacitor; said controller obtaining one of a signal and a command to begin monitoring a power discharge level in said at least one battery; and said controller disconnecting said at least one battery from said at least one external load when a battery power discharge level reaches a discharge threshold, wherein power drain from said at least one battery is limited such that full discharge thereof is prevented.

In one alternative said method comprises presetting said discharge threshold.

In another alternative said discharge threshold corresponds to a time threshold, the method comprising a prior step of presetting said time threshold.

In one alternative said discharge threshold corresponds to a time threshold, the method comprising: monitoring a power load level supplied by said at least one battery; and obtaining said time threshold from said power load level.

According to yet another alternative said discharge threshold corresponds to a time threshold, the method comprising: monitoring a power load level drained by said at least one external loads from said at least one battery; and obtaining said time threshold from said power load level.

In yet another alternative said controller further comprising: monitoring mains power; and clearing said a command to stop monitoring said power discharge level in said at least one battery connecting said at least one battery to said at least one external load.

DETAILED DESCRIPTION

Figure 1:
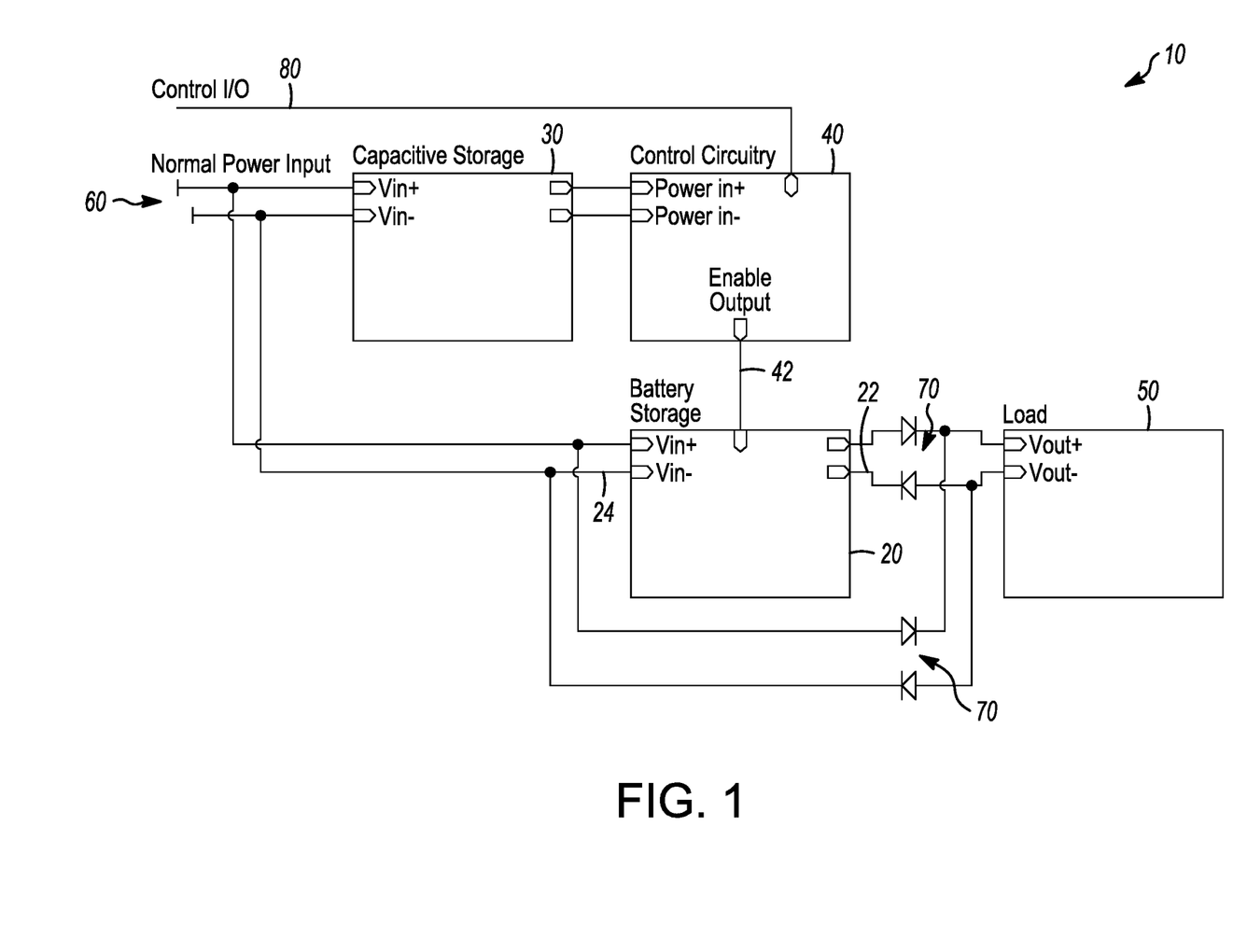
FIG. 1 is a schematic view of a power backup system according to one alternative.

Referring now to FIG. 1, there is depicted a schematic view of a proposed power backup system 10 used in a train car according to one alternative. In this alternative, the backup system 10 includes battery storage 20, capacitive storage 30, a control circuitry 40 and a load 50 external to the power backup system 10.

Capacitive storage 30 can be one or a bank of capacitors in series, parallel and/or combinations thereof. Battery storage 20 can be a one or a bank of batteries in series, parallel and/or combinations thereof. The external load 50 may be any load known to a person of ordinary skill in the art and can include without limitation lighting, preferably LED lighting; communication systems such as, but not limited to: emergency management systems; passenger information boards, public announcement systems, etc.; Ethernet switches; radio transceivers, radio receivers, and radio transmitter; amplifiers and combinations thereof.

During normal operation, the train car and thereby the power backup system 10 is powered by mains power input 60, for example from the locomotive or from shore (power grid). As such, during normal operations of the train car, the mains input 60 powers the capacitor 30, battery 20 and any external load 50.

The control circuitry 40 can include a controller 40 configured to monitor input/output power levels of various components of the system 10 and particularly the power level of the battery 20. Controller 40 and can include a timer.

Diodes 70 between the battery 20 and external load(s) 50 protect the output poles 22 of the battery 20 from back current. The diodes 70 bridging the battery output poles 22 and battery input poles 24 also protect the output poles 22 of the battery 20, and also serve to protect the system 10 against reverse polarity conditions. Reverse polarity conditions can damage the battery 20 or prematurely discharge the capacitor 30.

A control input/output (I/O) line 80 is connected to the controller 40 and is used to provide (send) a signal or command to the controller 40 depending on the situation experienced by the train car itself of the train of cars as a whole. One such example situation is when main power 60 to the system 10 is lost, such as but not limited to when the train is put in an idle state, put off-line or during an emergency. Control I/O line 80 will send a signal to the controller 40 to activate the backup power system 10. It is understood that in other implementations, the control I/O line 80 is entirely internal to the controller 40, which monitors input power levels in the power line 60. The provision of, and as such the controller 40 obtaining, the signal or command initiates monitoring of battery discharge. From the FIG. 1, during mains power loss, the capacitor 30 is not provided with power from the mains power line 60 however, the capacitor 30 continues to supply power to controller 40. As illustrated, diodes 70 prevent power from the battery 20 to power the capacitor 30 and controller 40.

In this depiction (FIGS. 1 and 3), and in accordance with the proposed solution, the battery 20 powers the external load 50 and is controlled (42) by the controller 40 which itself is powered by capacitor 30. When the controller 40 senses and/or determines that the battery 20 is close to undergoing a substantial discharge, the controller 40 sends a signal to disconnect power from the battery 20 to the external load 50 therefore limiting further discharge of the battery 20. For example, a battery discharge level can be set via a discharge threshold, which may correspond to a battery reserve power capacity between 5% and 50%, preferably between 10% and 45%, preventing full discharge of the battery 20, with the capacitor 30 powering the controller 40. As implementation, the power discharge level, normalized to power drain rate of the actual load(s) 50, may be assessed using a timer. The controller 40 determines that a safe amount of time has elapsed since the start of the power loss event, for example based on the signal received over the control I/O line 80, the controller will send a signal via communication line 42 to the battery 20 to stop supplying power to the external load 50. In operation, the discharge threshold can be preset and/or the timer can be preset or set at runtime based on the power load supplied by the battery 20.

Returning to the schematic depicted in FIG. 1, reconnecting mains power to the train car, and thereby to the power backup system 10, returns the system 10 to normal operation providing power to external load(s) 50. Upon mains power restore event, the control I/O line 80 may be employed to signal the restore event to the controller 40 and/or controller 40 can clear the initially received command based on detection of mains power by monitoring thereof.

Reducing the number of full discharge and recharge cycles of the battery 20 extends the overall life of the rechargeable battery 20.

Figure 2:
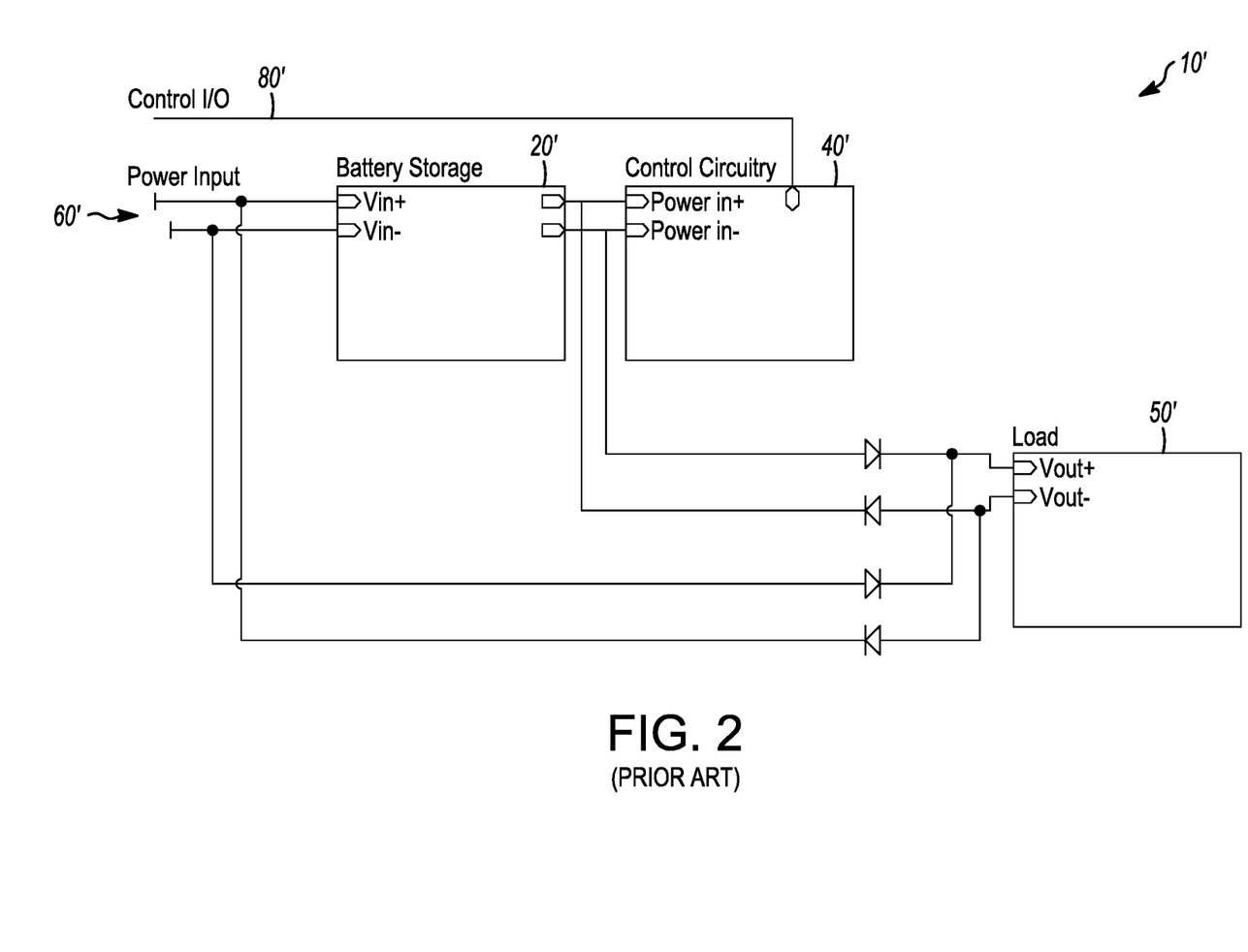
FIG. 2 is a depiction of a prior art system.

In contrast, as best seen in FIG. 2 which depicts a prior art system 10', a battery 20' is connected to power a controller 40' and an external load 50' without limiting the discharge cycle of the battery 20'. In particular, controller 40' is not in communication to the battery 20' and thus unable to control discharge of battery 20'. In this prior art configuration, despite the controller 40' being advised that main power 60' is cut off, the battery 20' continues power both the controller 40' and the external load 50' throughout the entire time the main power 60' is cut off from the system 10'. In this scenario, the battery 20' will be depleted of stored power given it is powering both the controller 40' and the external load 50'.

Figure 3:
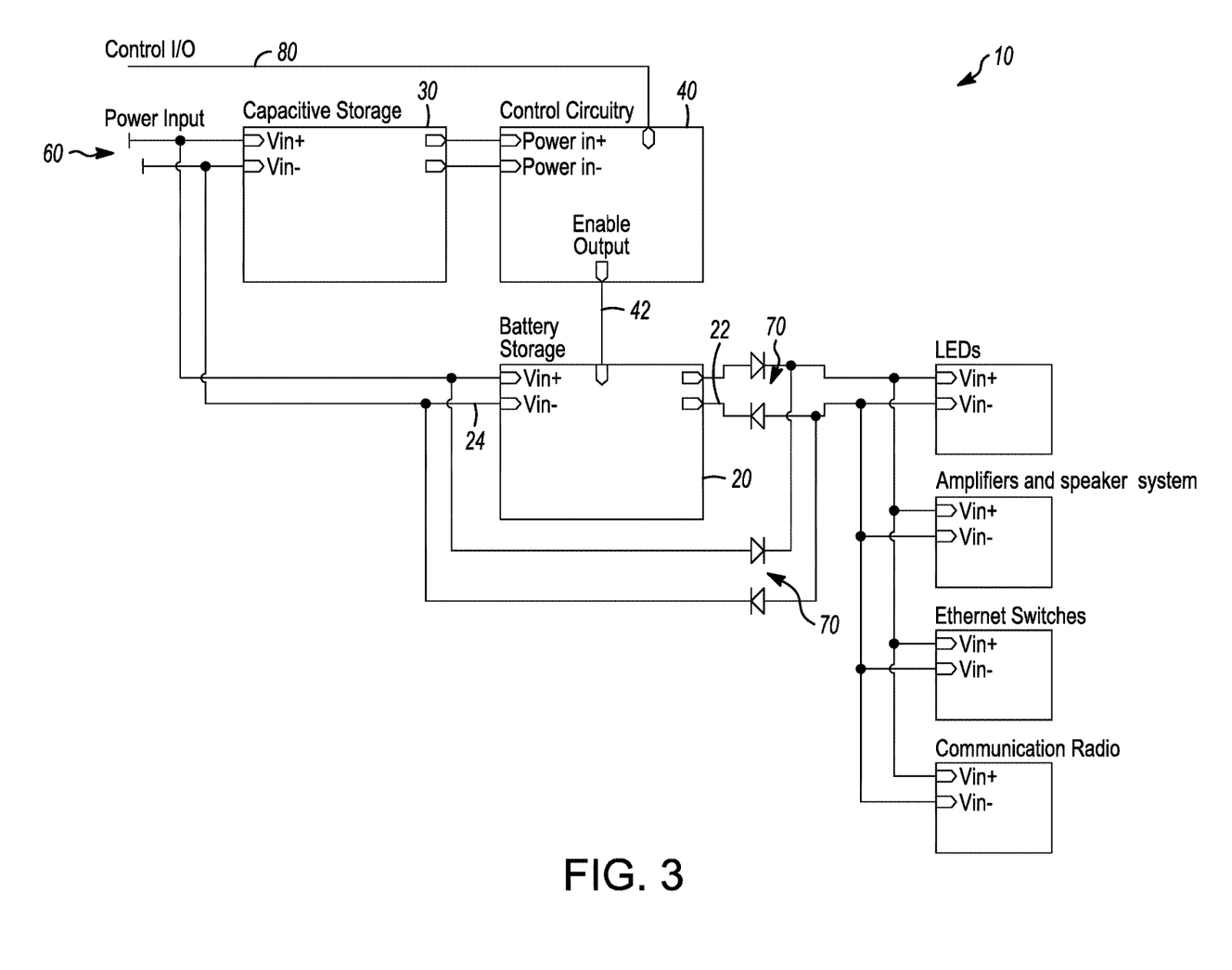
FIG. 3 is a depiction of the power backup system in use with multiple loads according to another implementation.

In accordance with another implementation, FIG. 3 depicts system 10 in use in a train car with a number of loads 50. Components depicted in FIG. 3 correspond to components depicted in FIG. 1 with same functionality with similarly labeled components depicted in FIG. 1. The functionality is not repeated solely for purposes of brief description herein. In idle state operation however, the battery 20 supplies power to multiple loads 50.

It is understood that the schematics depicted in FIGS. 1 and 3 are for illustration purposes only; it is contemplated that emergency situations exist in which the battery 20 may be used to selectively power the controller 40 despite the determination of the substantial discharge condition beyond the threshold exists; and/or it is contemplated that emergency loads 50 may always be supplied power from the battery 20.

While external loads have been described herein with respect to a train car, the disclosure is not limited to internal loads to the train car, other external loads to the train car can be powered for example emergency loads 50 in another train car.

While mains power can include typical mains power provided in rail, commercial and industrial applications/settings, an example of battery storage contemplated herein has an output power rating of 10 Ah at 36V. Respectively, an example of capacitive storage contemplated herein includes use of capacitors having a capacity rating of 1200 F at 2.7V. Other examples of capacitors include supercapacitors. For clarity, while the same mains power line 60 is illustrated to be supplied to both the capacitive storage 30 and battery storage 20, it is understood by a person of skill in the art that various voltage step-up and step-down circuits are omitted from illustration solely to simplify description herein. Similarly, the mains power line 60 may provide alternating current (AC) input power while capacitive storage 30 and battery storage 20 may require and output direct current (DC) power; it is understood by a person of skill in the art that various signal rectification and power wavetrain generators are omitted from illustration solely to simplify description herein.

It is understood that while typical batteries have two poles, more generically batteries can include charge circuits, sometimes referred to as smart batteries. Such generalized batteries depicted herein with 4 poles can have shared poles between charging connections and load connections.

It is understood that the controller 40 may be further employed (not shown) to control the charging the battery 20, for example employing the power monitoring referred to herein above.

The type of hybrid power backup system proposed herein extends battery life in an emergency storage backup application, for example providing idle monitoring/power management in a hybrid power backup system. This type of hybrid discharge would limit full discharge cycle count for the battery despite multiple power loss events in which the train has been disconnected from the locomotive or taken off the power grid. The system accomplishes this by preserving battery capacity and preventing full discharge cycles during idle states. By reducing the number of full discharge cycles to which the battery is subjected extends the operational life of the battery per se. Whereas, rated operational life of a rechargeable battery is rated at about 1000 full discharge cycles, capacitors, and in one example supercapacitors, can last for ~500,000 cycles. Conversely, the methods presented herein reduce the frequency of discharge cycles of a rechargeable battery in a power backup system compared to prior art power backup systems, and while such rechargeable batteries would be employed for about the same number of full discharge cycles the overall operational life of such a rechargeable battery is extended.

Increasing the operational life of the battery per se can reduce the cost associated with frequent battery replacement, including cost of disposing old battery, cost of purchasing new battery and labor cost associated therewith.

An added benefit to increasing the operational life of a rechargeable battery with the proposed system is a reduction in waste and harm to the environment.

Example 1: Comparison of Prior Art Battery Only System Versus Hybrid Power Back-Up System Independent battery back-up modules are integrated in many train/railcar applications to provide power to the lighting in emergency situations. These systems must be reliable and sustain their ability to keep enough capacity to allow for a proper duration of discharge in an emergency event.

In most end applications, the trains are powered up each weekday morning and powered down each week day night and also powered down for the entire weekend. Each one of these powered down events would trigger an emergency lighting discharge event. The lighting discharge event would last for 120 minutes and the back-up system would run idle for the rest of the duration of the powered down event. This would lead to 78 hours of idle operation per week, assuming the train is powered down for 8 hours every night and 48 hours on the weekend. Even though this idle power is significantly less than the power needed to energize the lighting, it still takes a toll on the lifetime of the battery itself, as the battery has a limited amount of charge and discharge cycles. Super capacitors on the other hand, can be charged and discharged more than 100,000 times, many supercapacitor brands claim >500,000 charge and discharge cycles. Batteries have far superior energy density, which makes them a good choice to power the emergency back up lighting, however the supercapacitors have enough energy density to power an idle circuit. It is expected that the combinations of these two technologies would be beneficial to the lifetime of an emergency lighting backup system.

References: Arts energy VHT F module datasheet www.arts-energy.com/uploads/VHT-F5.pdf; and Arts energy smart VHT module user manual www.arts-energy.com/uploads/Smart-module-user-manual-V2016-3.pdf.

Experimental Setup

Procedure

Connect the prior art emergency back-up system as per FIG. 2;

Engage an emergency back-up lighting discharge event;

After the event is over monitor the current coming from the battery over a duration of 60 hours;

Calculate the idle power;

Connect the Hybrid power emergency back-up system as per FIG. 1

Engage an emergency back-up lighting discharge event;

After the event is over monitor the current coming from the battery over a duration of 60 hours; and Monitor the current coming from the super-capacitor over a duration of 60 hours.

Recorded Data

Tabulated Results

Table 1 shows the measured idle current coming from the battery and its depth of depletion in the battery only system.

Table 2 shows the measured idle current coming from the super capacitor and battery and its depth of depletion in the hybrid system.

Figure 4:
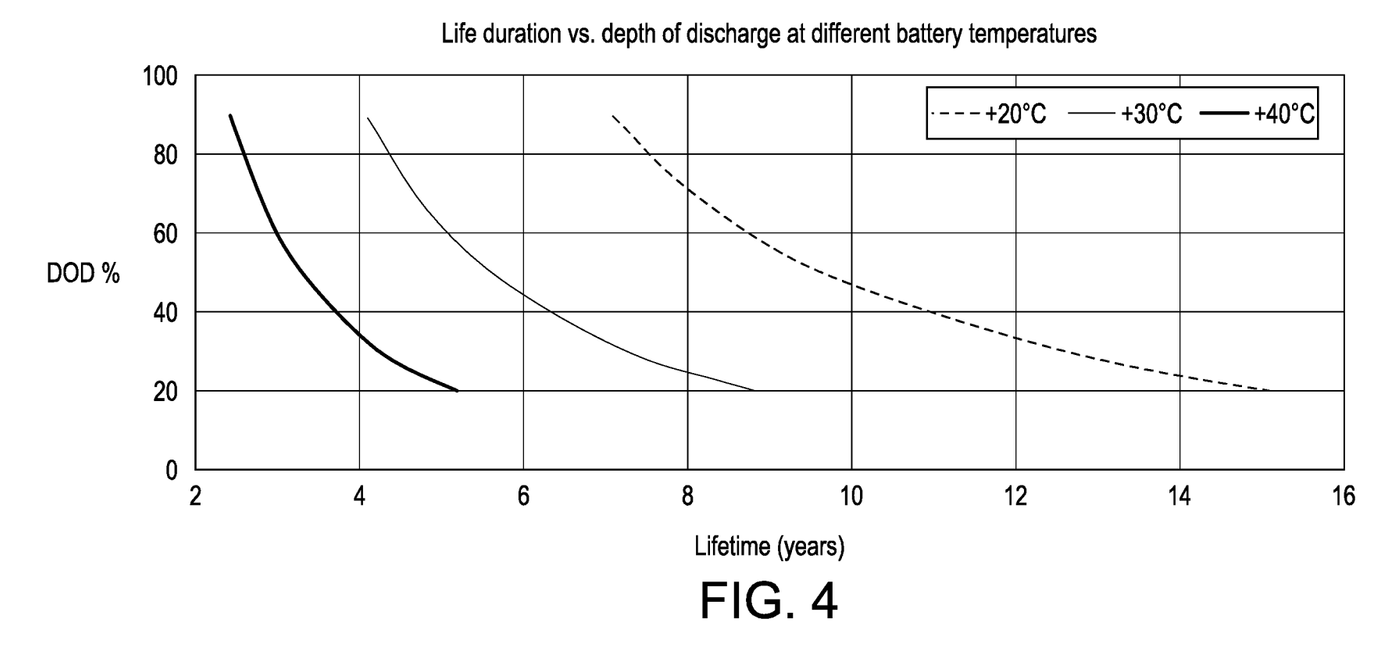
FIG. 4 is a chart showing the depth of discharge versus lifetime of the battery cells used in the battery only system and the hybrid system.

Combining the results from Table 1 and Table 2 with FIG. 4, Table 3 shows the projected lifetime of the prior art battery only system versus hybrid system based on an average temperature of 20° C. and an emergency lighting backup event causing a 50% depth of discharge.

Note, this projection is based upon the train being powered down for 8 hours every night and 48 hours every weekend, and at each power down event a two-hour emergency lighting discharge event occurs before the system enters an idle state.

Combining the results from Table 1 and Table 2 with FIG. 4, Table 4 shows the projected lifetime of the battery versus hybrid system based on an average temperature of 30° C. and an emergency lighting backup event causing a 50% depth of discharge.

Note, this projection is based upon the train being powered down for 8 hours every night and 48 hours every weekend, and at each power down event a two-hour emergency lighting discharge event occurs before the system enters an idle state.

Combining the results from Table 1 and Table 2 with FIG. 4, Table 5 shows the projected lifetime of the battery versus hybrid system based on an average temperature of 40 degrees and an emergency lighting backup event causing a 50% depth of discharge.

Note, this projection is based upon the train being powered down for 8 hours every night and 48 hours every weekend, and at each power down event a two-hour emergency lighting discharge event occurs before the system enters an idle state.

TABLE 1

Battery Only Measurements

| Hour | Output Current of Battery (mA) | Depth of Depletion on Battery (%) |
| --- | --- | --- |
| 0 | 54.2 | 50.0 |
| 6 | 54.9 | 53.3 |
| 10 | 55.3 | 55.5 |
| 15 | 54.3 | 58.2 |
| 20 | 56.0 | 61.0 |
| 25 | 54.8 | 63.8 |
| 30 | 54.9 | 66.5 |
| 35 | 54.5 | 69.2 |
| 40 | 55.5 | 72.0 |
| 45 | 55.7 | 74.8 |
| 50 | 54.0 | 77.5 |
| 55 | 54.6 | 80.2 |
| 60 | 54.5 | 82.9 |
| Average | 54.9 | |

TABLE 2

Hybrid System Measurements

| Hour | Output Current (mA) of Supercapacitor | Output Current (mA) of Battery | Depth of Depletion on Battery (%) |
| --- | --- | --- | --- |
| 0 | 46.0 | 0.0 | 50.0 |
| 6 | 46.1 | 0.0 | 50.0 |
| 10 | 46.0 | 0.0 | 50.0 |
| 15 | 45.9 | 0.0 | 50.0 |
| 20 | 45.9 | 0.0 | 50.0 |
| 25 | 46.8 | 0.0 | 50.0 |
| 30 | 46.1 | 0.0 | 50.0 |
| 35 | 47.6 | 0.0 | 50.0 |
| 45 | 46.9 | 0.0 | 50.0 |
| 50 | 46.7 | 0.0 | 50.0 |
| 57 | 47.0 | 0.0 | 50.0 |
| 58 | 0.0 | 54.3 | 51.1 |
| 60 | 0.0 | 56.0 | 52.2 |
| Average | 46.5 | 55.2 | |

TABLE 3

Lifetime projections at 20° C.

| Depth of Discharge | Rated Years of life from reference data sheet | Rated Cycles at Depth of Discharge from reference data sheet | Total Cycles per week for prior art Battery Only system | Battery System Yearly Impact (52*Cycles per week/rated cycles) | Total Cycles per week for Hybrid Impact (52*Cycles per week/rated cycles) | Hybrid System Yearly Impact (52*Cycles per week/rated cycles) |
|---|---|---|---|---|---|---|
| 82.9 | 7.37 | 2690 | 1 | 0.019330855 | 0 | 0 |
| 53.3 | 9.34 | 3409 | 4 | 0.06101496 | 0 | 0 |
| 50 | 9.64 | 3518 | 0 | 0 | 5 | 0.073905628 |
| Sum | | | | 0.080345815 | | 0.073905628 |
| Rated years of Life (1/Sum) | | | | 12.45 | | 13.53 |

TABLE 4

Lifetime projections at 30° C.

| Depth of Discharge | Rated Years of life from reference data sheet | Rated Cycles at Depth of Discharge from reference data sheet | Total Cycles per week for prior art Battery Only system | Battery System Yearly Impact (52*Cycles per week/rated cycles) | Total Cycles per week for Hybrid Impact (52*Cycles per week/rated cycles) | Hybrid System Yearly Impact (52*Cycles per week/rated cycles) |
|---|---|---|---|---|---|---|
| 82.9 | 4.28 | 1562 | 1 | 0.033290653 | 0 | 0 |
| 53.3 | 5.41 | 1974 | 4 | 0.105369807 | 0 | 0 |
| 50 | 5.56 | 2029 | 0 | 0 | 5 | 0.128141942 |
| Sum | | | | 0.138660461 | | 0.128141942 |
| Rated years of Life (1/Sum) | | | | 7.21 | | 7.80 |

TABLE 5

Lifetime projections at 40° C.

| Depth of Discharge | Rated Years of life from reference data sheet | Rated Cycles at Depth of Discharge from reference data sheet | Total Cycles per week for prior art Battery Only system | Battery System Yearly Impact (52*Cycles per week/rated cycles) | Total Cycles per week for Hybrid Impact (52*Cycles per week/rated cycles) | Hybrid System Yearly Impact (52*Cycles per week/rated cycles) |
|---|---|---|---|---|---|---|
| 82.9 | 2.53 | 920 | 1 | 0.056521739 | 0 | 0 |
| 53.3 | 3.25 | 1186 | 4 | 0.175379427 | 0 | 0 |
| 50 | 3.31 | 1210 | 0 | 0 | 5 | 0.214876033 |
| Sum | | | | 0.231901166 | | 0.214876033 |
| Rated years of Life (1/Sum) | | | | 4.31 | | 4.65 |

The above example under the specific conditions provide that lifetime of an emergency back up system may be enhanced by >7.9% using a hybrid system that incorporates the use of super-capacitors to power the idle modes of the supply when subjecting the back-up system to an industry standard weekly schedule.

As many changes can be made without departing from the scope thereof; it is intended that all matter contained herein be considered illustrative and not in a limiting sense.

The invention claimed is:

1. A hybrid power backup system for powering at least one external load when main power supply is unavailable, said hybrid power backup system comprising:

at least one battery for powering said at least one external load;

a controller in communication with said at least one battery, said controller being configured to control power provided by said at least one battery to said at least one external load and for controlling discharge cycles of said battery by disconnecting power from said at least one battery to said at least one external load for a predetermined period of time, when said controller senses a significant discharge of said at least one battery; and at least one capacitor for use in powering said controller, wherein the system further comprises an input signal line providing an indication of power loss to the controller, said controller obtaining one of a signal and a command to begin monitoring a power discharge level in said at least one battery; and said controller disconnecting said at least one battery from said at least one external load when a battery power discharge level reaches a discharge threshold, wherein power drain from said at least one battery is limited such that full discharge thereof is prevented.

2. The hybrid power backup system of claim 1, wherein said controller is configured to limit battery discharge by disconnecting said at least one external load from said at least one battery preventing full cycle discharge.

3. The hybrid power backup system of claim 1, wherein said controller is configured to limit each discharge of the at least one battery via a timer.

4. The hybrid power backup system of claim 3, wherein said timer is set in a range from about 90 to about 105 minutes from initial discharge start of a power loss event.

5. The hybrid power backup system of claim 1, further comprising an input signal line providing an indication of power loss to the controller.

6. The hybrid power backup system of claim 1, wherein said battery has a power rating of 36V, 10 Ah.

7. The hybrid power backup system of claim 1, wherein said at least one capacitor is a supercapacitor.

8. The hybrid power backup system of claim 1, wherein said capacitor has a capacity rating of 2.7V, 1200 F.

9. The hybrid power backup system of claim 1, wherein each external load comprises at least one load from: a lighting system, a communication system, an Ethernet switch, a radio transceiver, a radio receiver, a radio transmitter and an amplifier.

10. A hybrid power backup system for use when a train car is in an idle state or in a state in which mains power ceases to be available to the train car, said hybrid power backup system comprising:
   at least one battery for use in powering at least one external load of said train car when in said state;
   a controller in communication with said at least one battery, said controller configured to control power provided from said at least one battery to said at least one external load and for controlling discharge cycles of said battery by disconnecting power from said at least one battery to said at least one external load for a predetermined period of time, when said controller senses a significant discharge of said at least one battery; and
   at least one capacitor, for powering said controller,
   wherein the system further comprises an input signal line providing an indication of power loss to the controller, said controller obtaining one of a signal and a command to begin monitoring a power discharge level in said at least one battery; and said controller disconnecting said at least one battery from said at least one external load when a battery power discharge level reaches a discharge threshold, wherein power drain from said at least one battery is limited such that full discharge thereof is prevented.

11. The hybrid power backup system of claim 10, wherein the controller is configured to limit battery discharge by disconnecting said at least one external load from said at least one battery preventing full cycle discharge.

12. The hybrid power backup system of claim 10, wherein said controller is configured to limit each discharge of the at least one battery via a timer.

13. The hybrid power backup system of claim 12, wherein said timer is set in a range from about 90 to about 105 minutes from initial discharge start of a power loss event.

14. A method of reducing frequency of full discharge cycles of a rechargeable battery in a power backup system of a train car for at least one of a) powering at least one external load when main power supply is unavailable and b) use when the train car is in an idle state or in a state in which mains power ceases to be available to the train car, with a hybrid power backup system comprising at least one battery for use in powering at least one external load of said train car when in said state;
   a controller in communication with said at least one battery, said controller configured to control power provided from said at least one battery to said at least one external load and for controlling discharge cycles of said battery by disconnecting power from said at least one battery to said at least one external load for a predetermined period of time, when said controller senses a significant discharge of said at least one battery; and
   at least one capacitor, for powering said controller,
   wherein the system further comprises an input signal line providing an indication of power loss to the controller, said method comprising: powering said controller with said at least one capacitor; said controller obtaining one of a signal and a command to begin monitoring a power discharge level in said at least one battery; and said controller disconnecting said at least one battery from said at least one external load when a battery power discharge level reaches a discharge threshold, wherein power drain from said at least one battery is limited such that full discharge thereof is prevented.

15. The method of claim 14, comprising presetting said discharge threshold.

16. The method of claim 14, wherein said discharge threshold corresponds to a time threshold, the method comprising a prior step of presetting said time threshold.

17. The method of claim 14, wherein said discharge threshold corresponds to a time threshold, the method comprising: monitoring a power load level supplied by said at least one battery; and obtaining said time threshold from said power load level.

18. The method of claim 14, wherein said discharge threshold corresponds to a time threshold, the method comprising: monitoring a power load level drained by said at least one external load from said at least one battery; and obtaining said time threshold from said power load level.

19. The method of claim 14, said controller further comprising: monitoring mains power; and clearing said command to stop monitoring said power discharge level in said at least one battery connecting said at least one battery to said at least one external load.

\* \* \* \* \*